US008240552B2

(12) United States Patent
Kim et al.

(10) Patent No.: US 8,240,552 B2
(45) Date of Patent: Aug. 14, 2012

(54) METHOD AND SYSTEM FOR MEASURING TRAFFIC QUALITY IN DISTRIBUTION

(75) Inventors: Young Gon Kim, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 135 days.

(21) Appl. No.: 12/614,698

(22) Filed: Nov. 9, 2009

(65) Prior Publication Data

US 2010/0147943 A1 Jun. 17, 2010

(30) Foreign Application Priority Data

Dec. 16, 2008 (KR) ........................ 10-2008-0128054

(51) Int. Cl.
*G06K 7/10* (2006.01)
*G06F 7/00* (2006.01)
*G06Q 30/00* (2006.01)

(52) U.S. Cl. ........ 235/377; 235/376; 700/226; 705/333; 705/337

(58) Field of Classification Search .................. 235/377; 700/225, 226; 705/333, 337
See application file for complete search history.

(56) References Cited

U.S. PATENT DOCUMENTS

| | | | | |
|---|---|---|---|---|
| 6,298,013 | B1 * | 10/2001 | Berlin et al. | 368/10 |
| 7,243,001 | B2 * | 7/2007 | Janert et al. | 700/214 |
| 8,041,452 | B2 | 10/2011 | Park et al. | |
| 2004/0049316 | A1 * | 3/2004 | Pintsov et al. | 700/226 |
| 2005/0216294 | A1 * | 9/2005 | Labow | 705/1 |
| 2007/0050312 | A1 * | 3/2007 | Park et al. | 705/402 |
| 2007/0131765 | A1 | 6/2007 | Park et al. | |

FOREIGN PATENT DOCUMENTS

| | | | |
|---|---|---|---|
| KR | 10-2006-0088481 | A | 8/2006 |
| KR | 10-2007-0061174 | A | 6/2007 |
| KR | 10-0763520 | | 9/2007 |
| KR | 10-2008-0030151 | A | 4/2008 |

* cited by examiner

*Primary Examiner* — Thien M. Le
*Assistant Examiner* — Toan Ly
(74) *Attorney, Agent, or Firm* — NSIP Law

(57) ABSTRACT

Provided is a method and system for measuring traffic quality in distribution using test mail into which a radio frequency identity tag is inserted. The system accepts at least one test distribution piece including a tag, and collects information of test distribution by sensing a tag included with the test distribution piece at measuring points for measuring a time from acceptance to delivery of a general distribution piece. The system generates a processing rate and a delivery rate of distribution based on information of the test distribution pieces collected from the measuring points.

20 Claims, 5 Drawing Sheets

METHOD AND SYSTEM FOR MEASURING TRAFFIC QUALITY IN DISTRIBUTION

CROSS-REFERENCE TO RELATED APPLICATION

This application claims priority to and the benefit of Korean Patent Application No. 10-2008-0128054 filed in the Korean Intellectual Property Office on Dec. 16, 2008, the entire contents of which are incorporated herein by reference.

BACKGROUND OF THE INVENTION (a) Field of the Invention

The present invention relates to a method and system for measuring traffic quality in distribution. Particularly, the present invention relates to a method and system for measuring traffic quality in distribution using test mail into which a radio frequency identification (RFID) tag is inserted.

(b) Description of the Related Art

An RFID system represents a non-contact recognition system for identifying a thin-film type RFID tag attached on an object and transmitting and processing the identification through a radio frequency signal. The RFID system is highlighted as a substitute for the barcode and as an identification and tracking skill, it is applied to various fields of industry such as traffic, distribution, logistics, and ports, and it is now introduced to mail distribution as a substitute for the barcode scanning process. However, the same is only applicable to containers for transport that are easy to be recognized, and there are no skills that are developed for the purpose of measuring traffic quality in distribution.

An existing method for measuring traffic quality of distribution is performed based on scanning of barcodes on the mail. The barcode scanning is used to track mail history and hand over, and to move it between public offices as well as to measure traffic quality. The traffic quality based on barcode scanning has the following limits.

First, barcode scanning can be omitted since it is performed by the operator's manual operation. Particularly, when there is congestion of a quantity of materials before and after festive days and manpower shortage occurs, people inevitably have to process mail without scanning the barcode. The phenomenon appears in common in every mail process all over the world, and it causes loss of data during the period that must be analyzed in the most important manner. Also, some information systems allows generation of virtual barcode data through direct input through the system without scanning the barcode, thereby worsening the reliability of barcode data.

Second, the available data are acquired from a limited number of categories of mail that provide a history tracking service for tracking the traffic of distribution. Since barcode scanning for tracking the history generates additional expenses during the mail delivery process, the history tracking service is only applied to special mail including registered mail and postal parcels. Therefore, it is impossible to measure per-section traffic quality of general mail of which the history cannot be tracked.

In addition, the quantity of material of the quality measuring target section cannot be controlled but it can only be analyzed depending on the generated quantity of materials, and most of the mail is not directly scanned but the container having the mail is scanned to substitute for mail scanning, thereby requiring a new method for measuring the traffic quality.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for measuring traffic quality in distribution for accurately and widely measuring traffic quality mail and a general distribution process.

An exemplary embodiment of the present invention provides a method for measuring traffic quality in distribution, including: accepting at least one test distribution piece including a tag; sensing the tag included with the test distribution piece and collecting information of the test distribution piece at measuring points for respectively measuring a time from acceptance to delivery of the general distribution piece; and generating a processing rate and a delivery rate of distribution based on information of the test distribution piece respectively collected from the measuring points.

Another embodiment of the present invention provides a system for measuring traffic quality in distribution including: a plurality of readers installed in respective points for sending or receiving distribution pieces, recognizing tags included with the test distribution pieces, and collecting information of the test distribution; and a central server for generating a processing rate and a delivery rate of distribution based on information of the collected test distribution pieces.

DETAILED DESCRIPTION OF THE EMBODIMENTS

Figure 1:
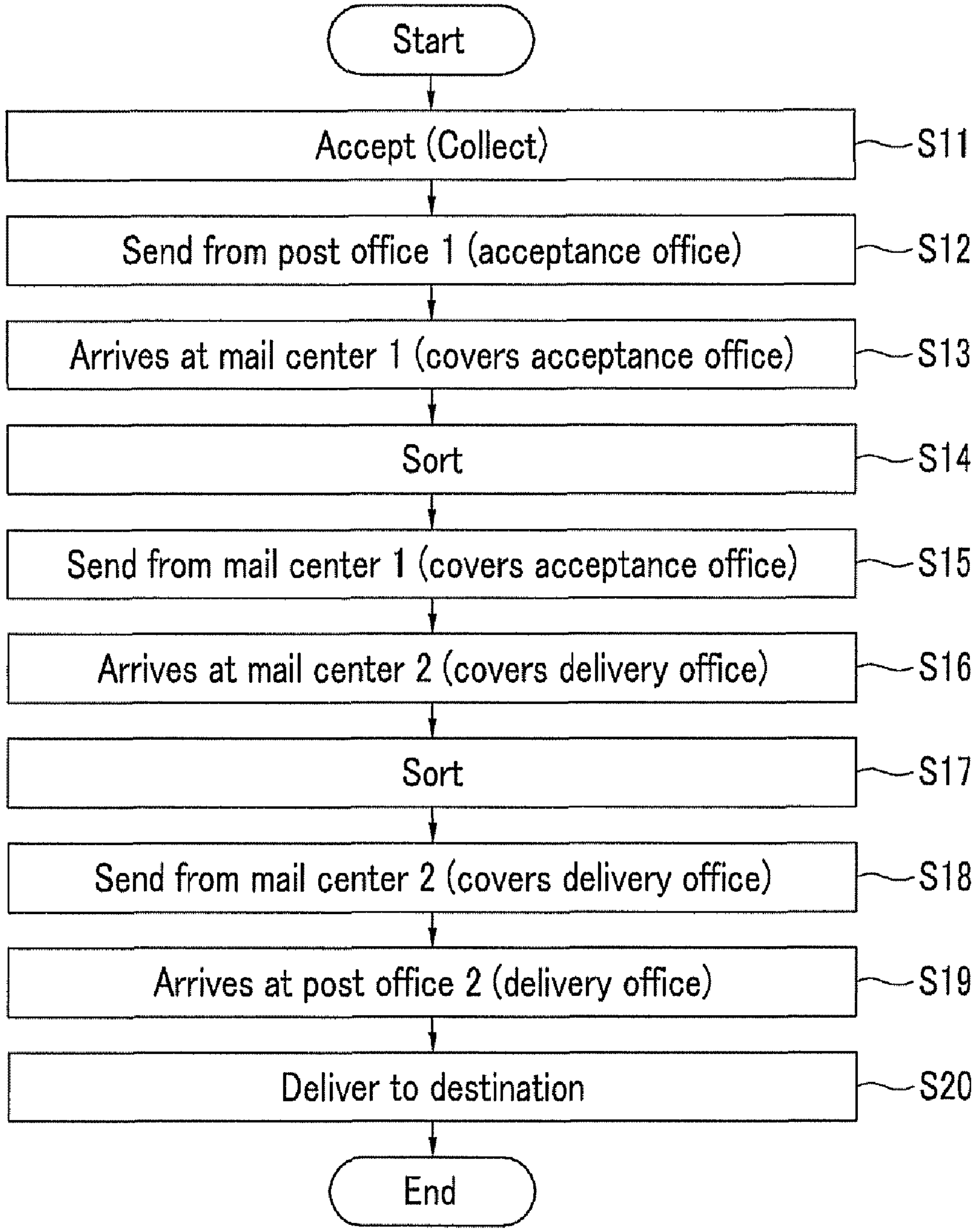
FIG. 1 shows a flowchart of a mail delivery process.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a distribution traffic quality measuring method and system according to an exemplary embodiment of the present invention will be described with reference to accompanying drawings.

The distribution traffic quality measuring method and system is applicable to a method for measuring traffic quality of materials to be delivered such as goods or mail. A mail delivery process will now be described in an embodiment of the present invention.

FIG. 1 shows a flowchart of a mail delivery process.

As shown in FIG. 1, the user has mail accepted by a first post office (S11). Further, the user has mail accepted, and it can be taken by a worker in charge in the post office.

The mail received by the first post office corresponding to the acceptance office is transmitted to a first mail center (S12). Here, the first mail center covers a plurality of acceptance offices including an acceptance office corresponding to the first post office.

When the mail arrives at the first mail center (S13), the first mail center sorts the mail for the respective mail centers (S14). The first mail center transmits the sorted mail to the corresponding second mail center (S15). In this instance, the second mail center covers a plurality of delivery offices including a delivery office corresponding to the second post office.

When the mail arrives at the second mail center (S16), the second mail center sorts the mail for respective mail centers (S17). The second mail center transmits the sorted mail to the corresponding second post office (S18). Here, the second post office represents a post office corresponding to the delivery office controlling the mail's destination.

When the mail arrives at the second post office (S19), the second post office delivers the mail to the mail's destination (S20).

A configuration of a distribution traffic quality measuring system for measuring traffic quality of distribution in the mail delivery process will now be described with reference to FIG. 2.

The measuring of traffic quality of mail according to the exemplary embodiment of the present invention is a process for measuring time spent for each section in the mail delivery process, and finding a per-section on-time processing rate and a problem section. Also, it is possible to analyze the mail delivery process based on the measured mail traffic quality, and to propose an optimized delivery process.

Figure 2:
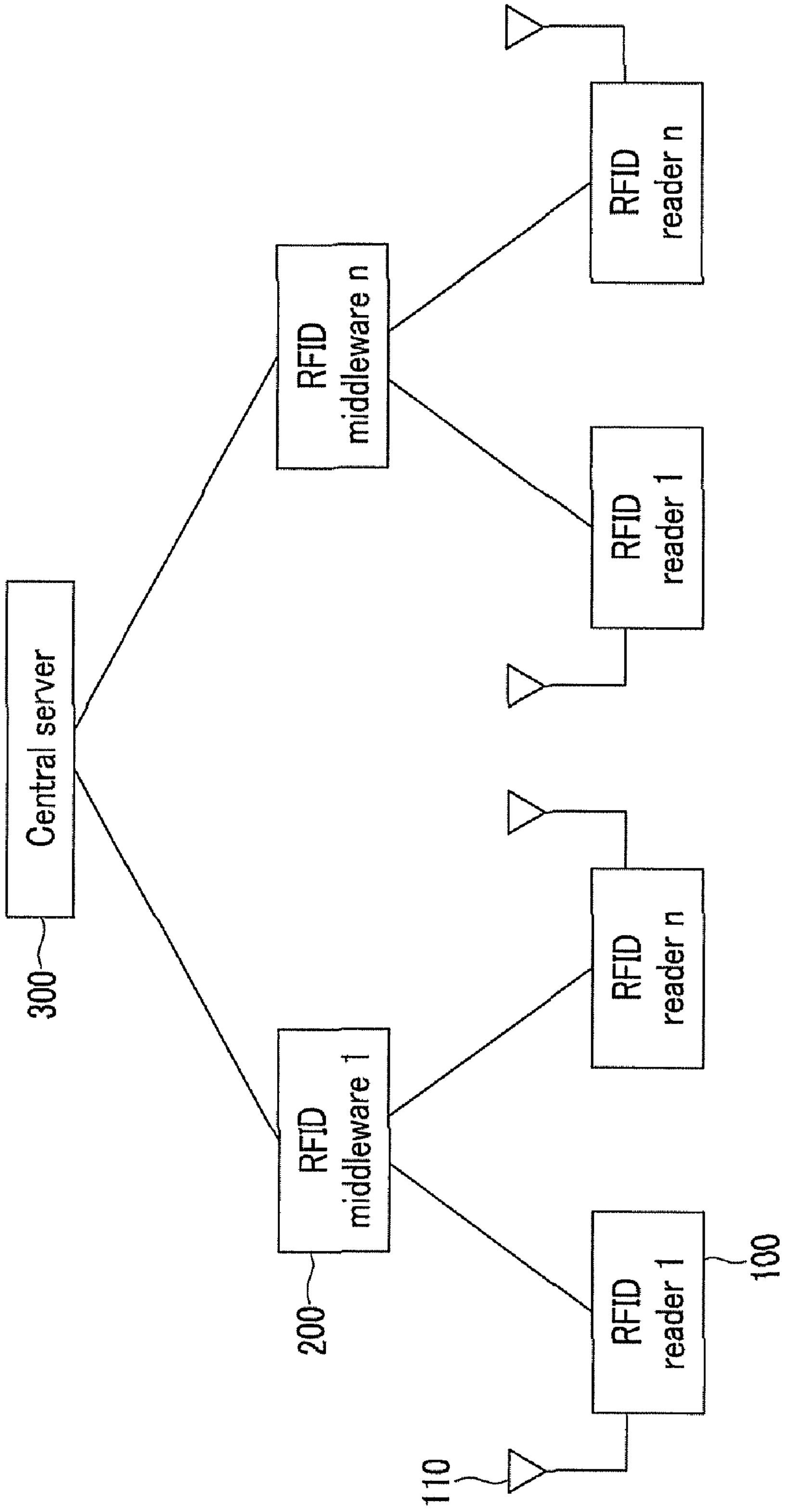
FIG. 2 shows a block diagram of a distribution traffic quality measuring system according to an exemplary embodiment of the present invention.
Figure 3:
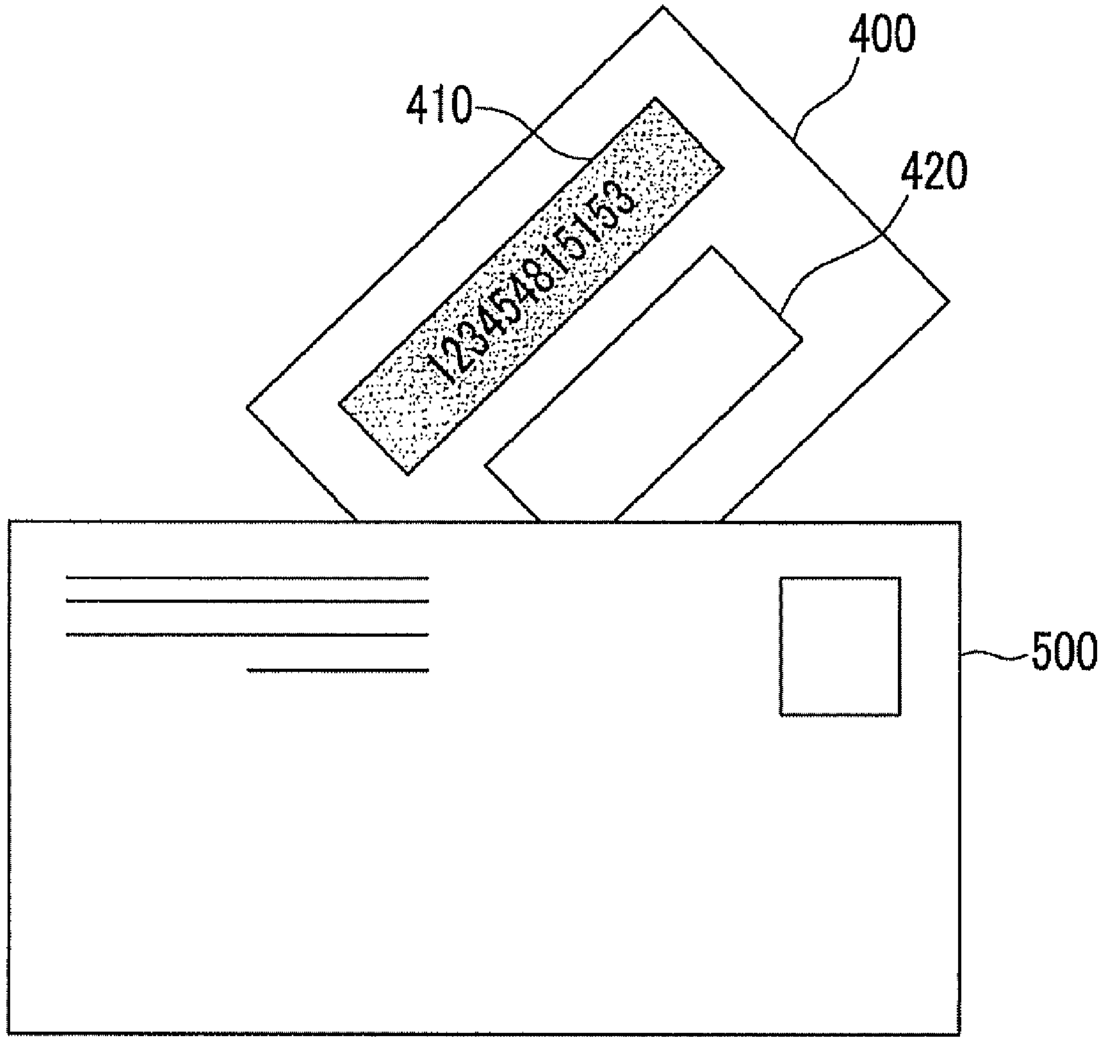
FIG. 3 shows test mail into which an RFID tag is inserted according to an exemplary embodiment of the present invention.

FIG. 2 shows a block diagram of a distribution traffic quality measuring system according to an exemplary embodiment of the present invention, and FIG. 3 shows test mail into which an RFID tag is inserted according to an exemplary embodiment of the present invention.

The distribution traffic quality measuring system generates test mail including an RFID tag, and transmits the same from a sending place to a destination. Here, the test mail can be a test distribution piece, and it is not restricted thereto.

Also, the distribution traffic quality measuring system recognizes the RFID tag through the RFID reader at each branch office during the mail delivery process, and measures test mail traffic quality to predict traffic quality of the overall distribution.

Regarding the detailed configuration of the distribution traffic quality measuring system with reference to FIG. 2, the distribution traffic quality measuring system includes a plurality of RFID readers 100, antennas 110 corresponding to the plurality of RFID readers 100, a plurality of RFID middleware 200, and a central server 300.

The plurality of RFID readers 100 are installed in each recognition point for recognizing mail in the mail center or the post office. Here, the mail center indicates an exclusive mail processing center for setting a coverage area in consideration of the amount of mail and transfer distance, and processing a huge volume of mail as a batch according to a rule by using a mechanic device during the process of sending and receiving mail moving through the areas, while the post office performs a postal service such as receipt, transfer, and delivery of mail.

The readers 100 output a recognition signal by using the corresponding antenna 110 to sense an RFID tag 420 included in test mail 400, and receives a tag signal from the RFID tag 420. Also, the RFID readers 100 collect information on the test mail 400 based on the tag signal. Here, information on the test mail 400 includes a time for sensing the RFID tag 420 included by the test mail 400, a time for accepting the test mail 400, a sending time, an arrival time, a sorting time, and a delivery time.

The plurality of RFID middleware 200 are installed in the mail center respectively, and are connected to the central server 300. The plurality of RFID middleware 200 transmit information on the test mail 400 from the plurality of respective RFID readers 100 to the central server 300.

The central server 300 stores information of the transmitted test mail 400, and sums the same to generate the on-time processing rate and the per-section on-time delivery rate for the respective public offices (post offices and mail centers).

Also, the central server 300 controls the distribution traffic of mail based on the generated on-time processing rate and the per-section on-time delivery rate for the respective public offices. Here, the central server 300 stores information on the test mail 400 as expressed in Table 1. The information of the test mail 400 according to the exemplary embodiment of the present invention is automatically generated by the RFID reader 100, and it may have better reliability than the information collected from the barcode.

TABLE 1

| Public office | Event | Generation time |
|---|---|---|
| Yusung post office | Collect | October 23, 14:30:10 |
| (acceptance office) | Send | October 23, 18:01:43 |
| Daejun mail center | Arrive | October 23, 19:20:21 |
| (covers acceptance office) | Sort | October 23, 23:00:16 |
| | Send | October 24, 05:10:18 |
| Chunan mail center | Arrive | October 24, 09:51:14 |
| (covers delivery office) | Sort | October 24, 16:21:51 |
| | Send | October 25, 05:22:01 |
| Asan post office | Arrive | October 25, 07:09:20 |
| (delivery office) | Deliver | October 25, 10:43:33 |

Also, the central server 300 displays the generated per-public-office on-time processing rate and the per-section on-time delivery rate to the user in a like manner of Table 2 and Table 3. In this instance, the on-time processing rate is a rate of the average processing time for the processing reference time for the respective public offices, and it is generated through the processing time of receiving and sorting mail at the post office or the mail center, the processing time from sorting to sending, and the time from receiving and sending. Also, the per-section on-time delivery rate is a rate about how accurately the mail will be delivered for each section at a predetermined time, and it is generated through the time of delivering it from the acceptance office to the delivery office for each section.

TABLE 2

| | Proc. Ref. time | Ave. spent time | On-time proc. rate |
|---|---|---|---|
| XX mail center | | | |
| Section 1 (arrive→sort) | 8 hours | 7.5 hours | 71% |
| Section 2 (sort→send) | 5 hours | 4.2 hours | 85% |
| Whole (arrive→send) | 13 hours | 1.7 hours | 80% |
| | . . . | | |
| XX post office | | | |
| Accept(collect)→send | 6 hours | 4.5 hours | 90% |
| Arrive→deliver | 7 hours | 5.2 hours | 80% |
| | . . . | | |

TABLE 3

| Acceptance office | Delivery office | On-time delivery rate |
|---|---|---|
| Yusung | Seocho | 88% |
| Andong | Seoguipo | 76% |
| Gangneng | Muju | 80% |
| . . . | . . . | . . . |

The distribution traffic quality measuring system includes RFID readers, RFID middleware, and a central server, and it is not restricted thereto.

As shown in FIG. 3, the RFID tag 420 storing an ID 410 and an ID 410 are attached on the test mail 400. In addition, the test mail 400 is provided in a predetermined envelope 500. Here, the shape of the envelope 500 is the same as other general mail so that the operator may process the test mail 400 included by the predetermined envelope 500 that is the same as general mail with the same priority as general mail.

The test mail 400 includes a predetermined sending place and destination, and analyzes the traffic quality in distribution of various sections with great reliability by setting plural sending places and destinations.

A test mail generation and delivery process according to an exemplary embodiment of the present invention will now be described in detail with reference to FIG. 4.

Figure 4:
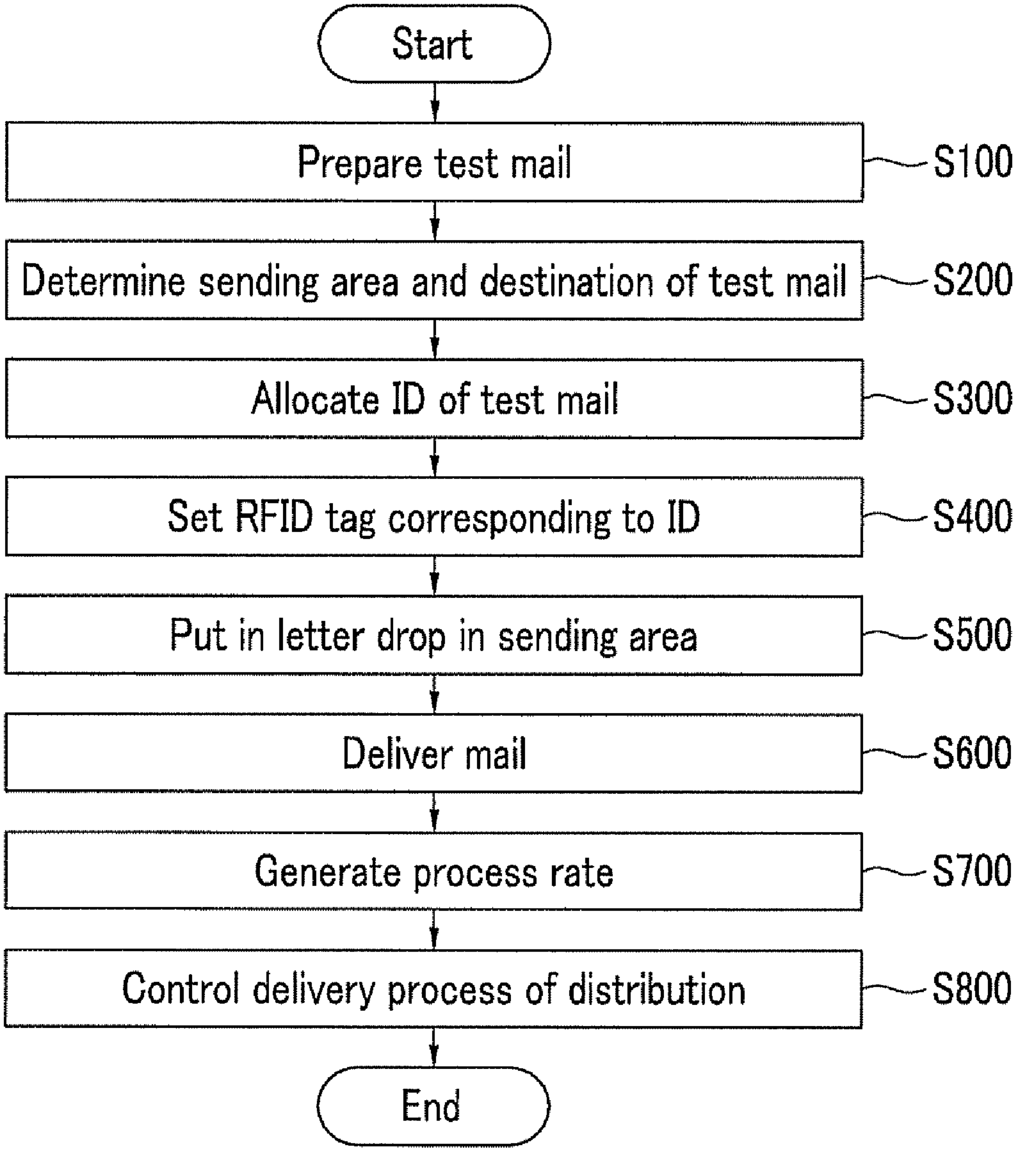
FIG. 4 shows a flowchart of a method for generating and delivering test mail according to an exemplary embodiment of the present invention.

FIG. 4 shows a flowchart of a method for generating and delivering test mail according to an exemplary embodiment of the present invention.

The distribution traffic quality measuring system prepares test mail 400 as shown in FIG. 3 (S100). The distribution traffic quality measuring system sets a sending place and a destination for the prepared test mail 400 (S200). The distribution traffic quality measuring system allocates an ID 410 corresponding to the test mail 400 with the sending place and destination (S300), and attaches an RFID tag 420 corresponding to the allocated ID 410 on the test mail 400 (S400).

The distribution traffic quality measuring system inserts test mail 400 including an RFID tag into the envelope on which the sending place and destination are written, and puts it into a letterbox in the area of the sending place or a letterbox in the post office (S500). Also, the distribution traffic quality measuring system accepts general distribution pieces or special mail by the post office instead of putting it into the letterbox. The test mail 400 is delivered to the destination in a like manner of the general mail delivery process as shown in FIG. 1 (S600). In the mail delivery process, the test mail 400 including an RFID tag is sensed at each point where the RFID reader 100 is installed. The RFID readers 100 transmit the sensing result that is information of the test mail 400 to the central server 300. In this instance, information of the test mail 400 includes a time for sensing the RFID tag 420 included by the test mail 400, a time for accepting the test mail 400, a sending time, an arrival time, a sorting time, and a delivery time.

The central server 300 of the distribution traffic quality measuring system generates the per-public-office on-time processing rate and the per-section on-time processing rate based on the information on the test mail 400 transmitted during the mail delivery process (S700). Also, the central server 300 controls the distribution delivery process based on distribution traffic quality information including the generated per-public-offices on-time processing rate and the per-section on-time processing rate (S800).

The distribution traffic quality measuring system provides distribution traffic quality information to the user so that the user controls the distribution delivery process based on the distribution traffic quality information.

A gate state of departure/arrival of the mail center and the post office to which the distribution traffic quality measuring system is applied during the mail delivery process according to an exemplary embodiment of the present invention will now be described in detail with reference to FIG. 5.

Figure 5:
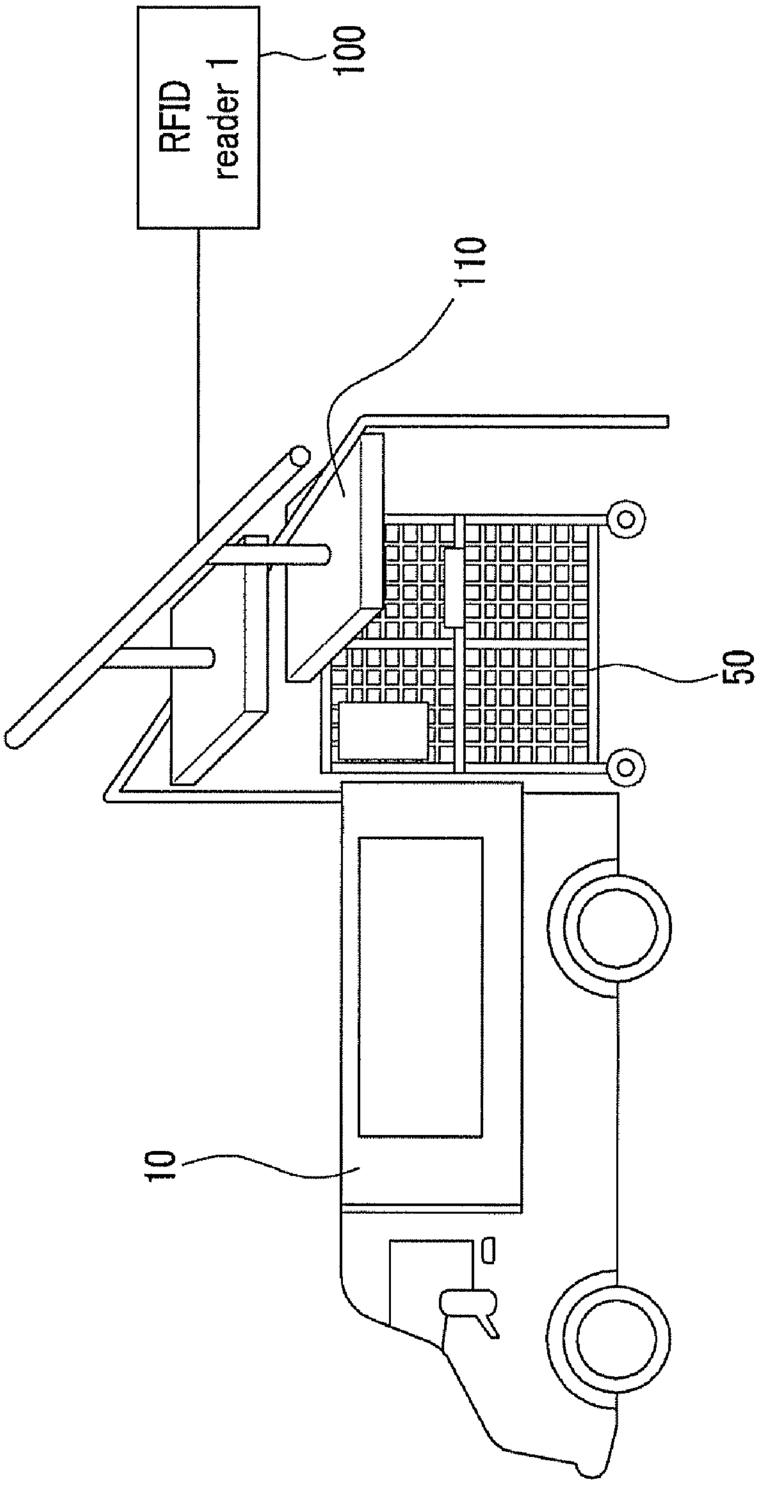
FIG. 5 shows a gate state of departure/arrival in the mail center and the post office on which a distribution traffic quality measuring system is applied during a mail delivery process according to an exemplary embodiment of the present invention.

FIG. 5 shows a gate state of departure/arrival in the mail center and the post office on which a distribution traffic quality measuring system is applied during a mail delivery process according to an exemplary embodiment of the present invention.

An RFID reader 100 and an antenna 110 are installed on the gate of the departure/arrival area of the mail center and the post office according to an exemplary embodiment of the present invention, but the embodiment is not restricted thereto. Further, the RFID reader 100 senses the RFID tag 420 included by the test mail 400 by outputting a recognition signal by using the antenna 110, and receives a tag signal from the sensed RFID tag 420 to collect information of the test mail 400.

As shown in FIG. 5, the mail including the test mail 400 is loaded into a container 50 to be carried by a delivery vehicle 10. The mail loaded in the container 50 is recognized when passing through the gate at which the RFID reader 100 and the antenna 110 are installed.

According to the embodiment of the present invention, excellent data required for measuring traffic quality can be acquired in real-time by automatically recognizing the test mail passing through the point where an RFID reader is installed. Also, the acquired data have more reliability than the data collected through the barcode since they are automatically generated by an RFID reader.

Further, the traffic quality can be measured with further detailed divided sections by installing the RFID reader in the point where the barcode was not scanned.

In addition, the data during the congestion of materials can be efficiently gathered since no further manpower is needed when the quantity of materials is increased. In general, traffic quality for general mail of which the barcode is not scanned can be measured, and a much greater amount of data can be acquired by increasing the quantity of materials for the problematic section and the desired section since the amount of test mail can be controlled freely.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for measuring traffic quality in distribution, the method comprising:

accepting at least one test distribution piece including a tag;

sensing, by a plurality of readers installed at a plurality of measuring points, the tag included with the test distribution piece and collecting information of the test distribution piece at the plurality of measuring points for respectively measuring a time from acceptance to delivery of a general distribution piece; and generating, by a central server, a processing rate and a delivery rate of distribution based on information of the test distribution piece respectively collected from the measuring points, wherein each reader is configured to collect the information and to transmit the collected information to the central server, in response to collecting the information.

2. The method of claim 1, wherein the accepting includes:

setting a sending place and a destination of the test distribution piece;

allocating an identification (ID) to the test distribution piece, generating an RFID tag corresponding to the ID, and including the same in the test distribution piece; and inserting the test distribution piece including the RFID tag into an envelope on which the sending place and the destination are written, and putting the same into a letterbox.

3. The method of claim 1, wherein the processing rate of the distribution piece is a rate of an average processing time for a processing reference time for the respective measuring points, and the delivery rate of the distribution piece is a rate for delivery to the measuring points at a predetermined time.

4. The method of claim 1, wherein the information of the test distribution piece includes a time for accepting the test distribution piece in a first post office, a time for sending it from the first post office, a time for the test distribution piece to arrive at a first mail center which covers an acceptance office, a time for sorting it for respective addresses at the first mail center, and a time for sending it from the first mail center.

5. The method of claim 4, wherein the information of the test distribution piece includes a time for sending the test distribution piece from the first mail center and receiving it at a second mail center which covers a delivery office, a time for sorting it for respective addresses in the second mail center, a time for sending it from the second mail center, a time for receiving it at a second post office corresponding to the delivery office, and a time for sending it at the second post office.

6. The method of claim 1, wherein there are at least four measuring points, the generating further comprises generating a processing rate and a delivery rate at each measuring point, each processing rate comprising an average processing time for processing a test distribution piece at the respective measuring point, and each delivery rate comprising a rate for delivery to the respective measuring point at a predetermined time.

7. The method of claim 1, wherein the sensing of the tag by the plurality of readers is performed without user interaction.

8. The method of claim 1, wherein the generating comprises generating a per-section processing rate between each measuring point, and identifying a problem section in which the processing rate is behind.

9. The method of claim 1, wherein the processing rate includes a per-section on-time delivery rate about how accurately the test distribution piece is delivered for each section at a predetermined time.

10. A system for measuring traffic quality in distribution, the system comprising:

a plurality of readers installed in respective measuring points for sending or receiving test distribution pieces, the plurality of readers configured to recognize tags included with the test distribution pieces, collect information of the test distribution pieces, and transmit the collected information to a central server; and the central server for generating a processing rate and a delivery rate of distribution based on information of the collected test distribution pieces, wherein each reader is configured to collect the information and to transmit the collected information to the central server, in response to collecting the information.

11. The system of claim 10, wherein the plurality of readers are installed in post offices corresponding to an acceptance office and a delivery office, and mail centers which respectively cover the acceptance office and the delivery office.

12. The system of claim 10, further including a plurality of middleware installed in the mail centers, receiving information of the test distribution pieces from the plurality of readers, and transmitting the same to the central server.

13. The system of claim 10, wherein the plurality of readers include an antenna for sensing a tag included with the test distribution pieces by outputting a recognition signal, and collect a tag signal from the sensed tag to collect information on the test distribution pieces based on the tag signal.

14. The system of claim 10, wherein the central server stores information of the test distribution and a processing rate and a delivery rate of the distribution pieces in a table form.

15. The system of claim 10, wherein there are at least four readers, and the central server generates a processing rate and a delivery rate at each location of the readers, each processing rate comprising an average processing time for processing a test distribution piece at the respective location, and each delivery rate comprising a rate for delivery to the respective location at a predetermined time.

16. The method of claim 10, wherein the processing rate includes a per-section on-time delivery rate about how accurately the test distribution piece is delivered for each section at a predetermined time.

17. A server that generates mail traffic quality information using test distribution pieces, the server configured to perform:

receiving information of the test distribution pieces collected by a plurality of readers that are each located at a respective postal office;

generating processing rates and delivery rates of distribution based on the received information of the collected test distribution pieces; and displaying the processing rates and the delivery rates.

18. The server of claim 17, wherein the generating comprises generating a table that comprises a first column identifying the post office, a second column identifying the event that took place at the respective post office, and a third column identifying the time the event took place.

19. The server of claim 17, wherein the generating comprises generating a table that comprises a first column identifying an action that took place at the post office, a second column identifying a processing reference time for the action, a third column identifying an average time actually spent for the action, and a fourth column identifying the percentage of on-time processing rate for the action.

20. The server of claim 17, wherein the generating comprises generating a table that comprises a first column identifying an accepting post office, a second column identifying a delivery post office, and a third column identifying an on-time delivery rate for a piece of mail accepted at the accepting office and delivered at the delivery office.

* * * * *